United States Patent
Hankins et al.

(10) Patent No.: US 6,920,693 B2
(45) Date of Patent: Jul. 26, 2005

(54) DYNAMIC SELF-ADJUSTING ASSEMBLY FOR SEALING, BAFFLING OR STRUCTURAL REINFORCEMENT

(75) Inventors: Timothy Hankins, Oxford, MI (US); Robert Wieber, Lapeer, MI (US)

(73) Assignee: L&L Products, Inc., Romeo, MI (US)

( * ) Notice: Subject to any disclaimer, the term of this patent is extended or adjusted under 35 U.S.C. 154(b) by 61 days.

(21) Appl. No.: 10/617,058

(22) Filed: Jul. 10, 2003

(65) Prior Publication Data

US 2004/0051251 A1 Mar. 18, 2004

Related U.S. Application Data

(60) Provisional application No. 60/398,257, filed on Jul. 24, 2002.

(51) Int. Cl.[7] .............................................. B21D 53/88
(52) U.S. Cl. ......................... 29/897.2; 29/428; 29/447; 29/530; 296/146.6; 296/187.02
(58) Field of Search ............................... 29/428, 897.1, 29/897.2, 446, 447, 527.1, 530; 296/187.02, 187.03, 146.6; 428/36.5, 319.3; 264/46.6

(56) References Cited

U.S. PATENT DOCUMENTS

| | | | |
|---|---|---|---|
| 4,369,608 A | * | 1/1983 | Miura et al. ................ 52/309.9 |
| 4,378,394 A | * | 3/1983 | Miura et al. ................ 428/113 |
| 4,378,395 A | * | 3/1983 | Asoshina et al. ........... 428/158 |
| 4,451,518 A | * | 5/1984 | Miura et al. ................ 428/137 |
| 4,463,870 A | | 8/1984 | Coburn, Jr. et al. |
| 4,610,836 A | | 9/1986 | Wycech |
| 4,751,249 A | | 6/1988 | Wycech |
| 4,769,391 A | | 9/1988 | Wycech |
| 4,769,951 A | | 9/1988 | Kaaden |
| 4,813,690 A | | 3/1989 | Coburn, Jr. |
| 4,836,516 A | | 6/1989 | Wycech |
| 4,853,270 A | | 8/1989 | Wycech |
| 4,861,097 A | | 8/1989 | Wycech |
| 4,901,500 A | | 2/1990 | Wycech |
| 4,922,596 A | | 5/1990 | Wycech |

(Continued)

FOREIGN PATENT DOCUMENTS

| | | |
|---|---|---|
| DE | 38 38 655 A1 | 5/1990 |
| DE | 198 12 288 C1 | 5/1999 |
| DE | 198 56 255 C1 | 1/2000 |

(Continued)

OTHER PUBLICATIONS

Copending U.S. Appl. No. 09/631,211 filed Aug. 3, 2000.
Copending U.S. Appl. No. 10/404,831 filed Apr. 1, 2003.
European Search Report dated Jun. 24, 2004 for Application Serial No. 03016386.
Born, Peter and Bernd Mayer, "Structural Bonding in Automotive Applications", AutoTechnology, Apr. 2004, pp. 44–47.

*Primary Examiner*—Essama Omgba
(74) *Attorney, Agent, or Firm*—Dobrusin & Thennisch PC

(57) ABSTRACT

There is disclosed a reinforced structural assembly and a method of using the assembly for sealing, baffling and/or reinforcing components of an automotive vehicle. The assembly generally includes at least a first mass of expandable material. Preferably, the first mass is movably (e.g., rotatably) connected to a second mass of material and/or another member. According to the method, the assembly is placed in a cavity of an automotive vehicle and the at least one mass is activated to expand. Preferably, upon activation, the first mass self adjusts by moving (e.g., rotating) relative to the second mass and/or the other member.

23 Claims, 3 Drawing Sheets

U.S. PATENT DOCUMENTS

| | | | |
|---|---|---|---|
| 4,923,902 A | 5/1990 | Wycech | |
| 4,978,562 A | 12/1990 | Wycech | |
| 5,124,186 A | 6/1992 | Wycech | |
| 5,160,465 A | 11/1992 | Soderberg | |
| 5,266,133 A | 11/1993 | Hanley et al. | |
| 5,344,208 A * | 9/1994 | Bien et al. | 296/187.02 |
| 5,358,397 A | 10/1994 | Ligon et al. | |
| 5,506,025 A | 4/1996 | Otto et al. | |
| 5,575,526 A | 11/1996 | Wycech | |
| 5,631,027 A | 5/1997 | Takabatake | |
| 5,642,914 A | 7/1997 | Takabatake | |
| 5,725,272 A | 3/1998 | Jones | |
| 5,755,486 A | 5/1998 | Wycech | |
| 5,766,719 A | 6/1998 | Rimkus | |
| 5,806,915 A | 9/1998 | Takabatake | |
| 5,884,960 A | 3/1999 | Wycech | |
| 5,888,600 A | 3/1999 | Wycech | |
| 5,931,474 A | 8/1999 | Chang et al. | |
| 5,932,680 A | 8/1999 | Heider | |
| 5,985,435 A | 11/1999 | Czaplicki et al. | |
| 5,992,923 A | 11/1999 | Wycech | |
| 6,003,274 A | 12/1999 | Wycech | |
| 6,006,484 A | 12/1999 | Geissbuhler | |
| 6,033,300 A | 3/2000 | Schneider | |
| 6,053,210 A | 4/2000 | Chapman et al. | |
| 6,059,342 A | 5/2000 | Kawai et al. | |
| 6,068,424 A | 5/2000 | Wycech | |
| 6,079,180 A | 6/2000 | Wycech | |
| 6,092,864 A | 7/2000 | Wycech et al. | |
| 6,093,358 A | 7/2000 | Schiewe et al. | |
| 6,096,403 A | 8/2000 | Wycech et al. | |
| 6,099,948 A | 8/2000 | Paver, Jr. | |
| 6,103,341 A | 8/2000 | Barz et al. | |
| 6,131,897 A | 10/2000 | Barz et al. | |
| 6,146,565 A | 11/2000 | Keller | |
| 6,149,227 A | 11/2000 | Wycech | |
| 6,150,428 A | 11/2000 | Hanley, IV et al. | |
| 6,165,588 A | 12/2000 | Wycech | |
| 6,168,226 B1 | 1/2001 | Wycech | |
| 6,189,953 B1 | 2/2001 | Wycech | |
| 6,196,621 B1 | 3/2001 | VanAssche et al. | |
| 6,199,940 B1 | 3/2001 | Hopton et al. | |
| 6,207,244 B1 | 3/2001 | Hesch | |
| 6,233,826 B1 | 5/2001 | Wycech | |
| 6,237,304 B1 | 5/2001 | Wycech | |
| 6,247,287 B1 | 6/2001 | Takabatake | |
| 6,253,524 B1 | 7/2001 | Hopton et al. | |
| 6,263,635 B1 | 7/2001 | Czaplicki | |
| H1976 H * | 8/2001 | Lambrakos et al. | 29/527.2 |
| 6,270,600 B1 | 8/2001 | Wycech | |
| 6,272,809 B1 | 8/2001 | Wycech | |
| 6,276,105 B1 | 8/2001 | Wycech | |
| 6,281,260 B1 | 8/2001 | Hanley, IV et al. | |
| 6,287,666 B1 | 9/2001 | Wycech | |
| 6,296,298 B1 | 10/2001 | Barz | |
| 6,305,136 B1 | 10/2001 | Hopton et al. | |
| 6,311,452 B1 | 11/2001 | Barz et al. | |
| 6,315,938 B1 | 11/2001 | Jandali | |
| 6,319,964 B1 | 11/2001 | Blank et al. | |
| 6,321,793 B1 | 11/2001 | Czaplicki et al. | |
| 6,332,731 B1 | 12/2001 | Wycech | |
| 6,341,467 B1 | 1/2002 | Wycech | |
| 6,347,799 B1 | 2/2002 | Williams et al. | |
| 6,357,819 B1 | 3/2002 | Yoshino | |
| 6,358,584 B1 | 3/2002 | Czaplicki | |
| 6,368,438 B1 | 4/2002 | Chang et al. | |
| 6,372,334 B1 | 4/2002 | Wycech | |
| D457,120 S | 5/2002 | Broccardo et al. | |
| 6,382,635 B1 | 5/2002 | Fitzgerald | |
| 6,383,610 B1 | 5/2002 | Barz et al. | |
| 6,389,775 B1 | 5/2002 | Steiner et al. | |
| 6,406,078 B1 | 6/2002 | Wycech | |
| 6,413,611 B1 | 7/2002 | Roberts et al. | |
| 6,419,305 B1 | 7/2002 | Larsen | |
| 6,422,575 B1 | 7/2002 | Czaplicki et al. | |
| H2047 H | 9/2002 | Harrison et al. | |
| 6,455,146 B1 | 9/2002 | Fitzgerald | |
| 6,467,834 B1 | 10/2002 | Barz et al. | |
| 6,471,285 B1 | 10/2002 | Czaplicki et al. | |
| 6,474,722 B2 | 11/2002 | Barz | |
| 6,474,723 B2 | 11/2002 | Czaplicki et al. | |
| 6,475,577 B1 | 11/2002 | Hopton et al. | |
| 6,482,486 B1 | 11/2002 | Czaplicki et al. | |
| 6,482,496 B1 | 11/2002 | Wycech | |
| 6,491,336 B1 | 12/2002 | Beckmann et al. | |
| 6,494,525 B1 * | 12/2002 | Blank | 296/187.02 |
| 6,502,821 B2 | 1/2003 | Schneider | |
| 6,519,854 B2 | 2/2003 | Blank | |
| 6,523,857 B1 | 2/2003 | Hopton et al. | |
| 6,523,884 B2 | 2/2003 | Czaplicki et al. | |
| 6,546,693 B2 | 4/2003 | Wycech | |
| 6,550,847 B2 * | 4/2003 | Honda et al. | 296/146.6 |
| 6,561,571 B1 | 5/2003 | Brennecke | |
| 6,573,309 B1 | 6/2003 | Reitenbach et al. | |
| 6,575,526 B2 | 6/2003 | Czaplicki et al. | |
| 6,585,202 B2 | 7/2003 | Broccardo et al. | |
| 6,607,238 B2 | 8/2003 | Barz | |
| 6,619,727 B1 | 9/2003 | Barz et al. | |
| 6,634,698 B2 | 10/2003 | Kleino | |
| 6,641,208 B2 | 11/2003 | Czaplicki et al. | |
| 6,668,457 B1 | 12/2003 | Czaplicki | |
| 6,692,347 B1 | 2/2004 | Schneider | |
| 6,722,720 B2 | 4/2004 | Donick et al. | |
| 6,729,425 B2 | 5/2004 | Schneider et al. | |
| 6,748,667 B2 | 6/2004 | Sevastian | |
| 6,777,049 B2 | 8/2004 | Sheldon et al. | |
| 6,786,533 B2 * | 9/2004 | Bock et al. | 296/187.02 |
| 6,793,274 B2 | 9/2004 | Riley et al. | |
| 6,811,864 B2 | 11/2004 | Czaplicki et al. | |
| 6,820,923 B1 | 11/2004 | Bock | |
| 2002/0053179 A1 | 5/2002 | Wycech | |
| 2002/0074827 A1 | 6/2002 | Fitzgerald et al. | |
| 2002/0160130 A1 | 10/2002 | Sheldon et al. | |
| 2002/0164450 A1 | 11/2002 | Lupini et al. | |
| 2002/0174954 A1 | 11/2002 | Busseuil et al. | |
| 2003/0001469 A1 | 1/2003 | Hankins et al. | |
| 2003/0039792 A1 | 2/2003 | Hable et al. | |
| 2003/0042056 A1 | 3/2003 | Schneider et al. | |
| 2003/0050352 A1 | 3/2003 | Guenther et al. | |
| 2003/0057737 A1 | 3/2003 | Bock et al. | |
| 2003/0062739 A1 | 4/2003 | Bock | |
| 2003/0069335 A1 | 4/2003 | Czaplicki et al. | |
| 2003/0090129 A1 | 5/2003 | Riley et al. | |
| 2003/0140671 A1 | 7/2003 | Lande et al. | |
| 2003/0144409 A1 | 7/2003 | Kassa et al. | |
| 2003/0176128 A1 | 9/2003 | Czaplicki et al. | |
| 2003/0183317 A1 | 10/2003 | Czaplicki et al. | |
| 2003/0184121 A1 | 10/2003 | Czaplicki et al. | |
| 2003/0186049 A1 | 10/2003 | Czaplicki et al. | |
| 2003/0201572 A1 | 10/2003 | Coon et al. | |
| 2003/0218019 A1 | 11/2003 | Le Gall et al. | |
| 2004/0011282 A1 | 1/2004 | Myers et al. | |
| 2004/0074150 A1 | 4/2004 | Wycech | |
| 2004/0079478 A1 | 4/2004 | Merz | |
| 2004/0135058 A1 | 7/2004 | Wycech | |

FOREIGN PATENT DOCUMENTS

| | | |
|---|---|---|
| DE | 198 58 903 A1 | 6/2000 |
| EP | 0 414 302 A1 | 8/1990 |
| EP | 0 611 778 A3 | 1/1994 |
| EP | 0 891 918 A1 | 1/1999 |

| | | | | | | |
|---|---|---|---|---|---|---|
| EP | 0 893 331 A1 | 1/1999 | | WO | WO 97/02967 | 1/1997 |
| EP | 0 893 332 A1 | 1/1999 | | WO | WO 97/43501 | 11/1997 |
| EP | 1 006 22 A2 | 6/2000 | | WO | WO 98/50221 | 11/1998 |
| EP | 1 122 156 A2 | 8/2001 | | WO | WO 99/08854 | 2/1999 |
| EP | 0 893 332 B1 | 3/2002 | | WO | WO 99/28575 | 6/1999 |
| EP | 1 006 022 B1 | 9/2003 | | WO | WO 99/48746 | 9/1999 |
| EP | 1 362 683 A2 | 11/2003 | | WO | WO 99/50057 | 10/1999 |
| EP | 1 362 769 A1 | 11/2003 | | WO | WO 00/03894 | 1/2000 |
| EP | 1 428 744 A1 | 6/2004 | | WO | WO 00/13958 | 3/2000 |
| EP | 1 475 295 A2 | 11/2004 | | WO | WO 00/27920 | 5/2000 |
| FR | 2749263 | 12/1997 | | WO | WO 00/37302 | 6/2000 |
| GB | 2 375 328 | 11/2002 | | WO | WO 00/40815 | 7/2000 |
| JP | 01 069 308 | 3/1989 | | WO | WO 00/43254 | 7/2000 |
| JP | 3-197743 | 8/1991 | | WO | WO 00/46461 | 8/2000 |
| JP | 406156317 A | 6/1994 | | WO | WO 00/554444 | 9/2000 |
| JP | 10-45031 | 2/1998 | | WO | WO 01/30906 | 5/2001 |
| JP | 10053156 | 2/1998 | | WO | WO 01/54936 | 8/2001 |
| JP | 10-71628 | 3/1998 | | WO | WO 01/71225 | 9/2001 |
| JP | 2000-52444 | 2/2000 | | WO | WO 01/83206 | 11/2001 |
| JP | 2001-62833 | 3/2001 | | WO | WO 01/88033 | 11/2001 |
| JP | 2001-88739 | 4/2001 | | WO | WO 03/042024 A1 | 5/2003 |
| JP | 2001-199362 | 7/2001 | | WO | WO 03/051676 A1 | 6/2003 |
| JP | 2002-120250 | 4/2002 | | WO | WO 01/24989 A1 | 4/2004 |
| JP | 2002331960 | 11/2002 | | | | |
| JP | 2002-362412 | 12/2002 | | * cited by examiner | | |
| WO | WO 95/32110 | 11/1995 | | | | |

DYNAMIC SELF-ADJUSTING ASSEMBLY FOR SEALING, BAFFLING OR STRUCTURAL REINFORCEMENT

CLAIM OF BENEFIT OF FILING DATE

The present application claims the benefit of the filing date of U.S. Provisional Application Ser. No. 60/398,257 (filed Jul. 24, 2002), hereby incorporated by reference.

FIELD OF THE INVENTION

The present invention relates generally to an assembly for providing sealing, baffling, structural reinforcement or a combination thereof to articles of manufacture. More particularly, the present invention relates to a dynamically self-adjusting assembly for providing improved sealing, baffling or structural reinforcement to cavities of automotive vehicles.

BACKGROUND OF THE INVENTION

For many years, the transportation industry has been concerned with designing components for providing baffling, sealing, structural reinforcement or the like to automotive vehicles. For example, U.S. Pat. Nos. 5,755,486; 4,901,500; and 4,751,249 describe prior art devices. Generally, the components include expandable materials, which may or may not be combined with other materials for forming seals, baffles, structural reinforcements or the like that fit into one or more cavities of an automotive vehicle. Once the components are placed in the cavities of the vehicle, the expandable materials may be expanded to secure the components in the cavities. However, it can be difficult to desirably position components within a cavity. For example, certain cavities are formed during assembly of the vehicle and may be substantially inaccessible for placement of components therein. Additionally, attachment of components at locations that cavities are expected to form can hinder assembly of the vehicle. Thus, the present invention seeks to provide an assembly for sealing, baffling and/or structurally reinforcing an automotive vehicle wherein the assembly can be more effectively positioned within a cavity of an automotive vehicle.

SUMMARY OF THE INVENTION

The present invention is directed to an assembly for providing at least one of sealing, baffling and structural reinforcement within a cavity of an automotive vehicle. The assembly provides a first mass of expandable material and a second mass of expandable material connected to each other by a connector. Preferably, the first mass is substantially disposed at an angle relative to the second mass. It is also preferable for the first mass, the second mass or both to substantially disconnect with the connector upon exposure to heat thereby allowing the first mass, the second mass or both to move (e.g. rotate) relative to each other.

Generally speaking, the assembly may utilize technology and processes such as those disclosed in U.S. Pat. Nos. 4,922,596, 4,978,562, 5,124,186, 5,884,960, 6,467,834, and 6,482,486, all of which are expressly incorporated by reference. Preferably the expandable materials of the present invention are an energy absorbing medium, and a heat activated bonding material. The expandable material may be a foamable or expandable material, which could comprise an epoxy-based resin, such as L5204, L5206, L5207, L5208 or L5209 foam commercially available from L & L Products of Romeo, Mich. Additional foamable or expandable materials that could be utilized in the present invention include other materials which are suitable as bonding mediums and which may be heat activated foams which activate and expand to fill a desired cavity or occupy a desired space or function when exposed to temperatures typically encountered in automotive e-coat and other paint operations. In addition, it is contemplated that the first and second members could comprise a nylon or other polymeric material as set forth in commonly owned U.S. Pat. No. 6,103,341, expressly incorporated by reference herein.

Though other heat-activated materials are possible, a preferred heat activated material is an expandable or flowable polymeric formulation, and preferably one that is activated to foam, flow or otherwise change states when exposed to the heating operation of a typical automotive assembly painting operation. For example, without limitation, in one embodiment, the polymeric foam is based on ethylene copolymer or terpolymer that may possess an alpha-olefin. As a copolymer or terpolymer, the polymer is composed of two or three different monomers, i.e., small molecules with high chemical reactivity that are capable of linking up with similar molecules. Examples of particularly preferred polymers include ethylene vinyl acetate, EPDM, or a mixture thereof. Without limitation, other examples of preferred foam formulation that are commercially available include polymer-based material commercially available from L&L Products, inc. of Romeo, Mich., under the designations as L-2105, L-2100, L-7005 or L-2018, L-7101, L-7102, L-2411, L-2412, L-4141, etc. and may comprise either open or closed cell polymeric base material.

A number of other suitable materials are known in the art and may also be used for vibration reduction. One such foam preferably includes a polymeric base material, such as an ethylene-based polymer which, when compounded with appropriate ingredients (typically a blowing and curing agent), expands and cures in a reliable and predictable manner upon the application of heat or the occurrence of a particular ambient condition. From a chemical standpoint for a thermally activated material, the vibration reducing foam is usually initially processed as a flowable thermoplastic material before curing. It will cross-link upon curing, which makes the material resistant of further flow or change of final shape.

It is contemplated that the material could be delivered and placed into contact with the assembly members, through a variety of delivery systems which include, but are not limited to, a mechanical snap fit assembly, extrusion techniques commonly known in the art as well as a mini-applicator technique as in accordance with the teachings of commonly owned U.S. Pat. No. 5,358,397 ("Apparatus For Extruding Flowable Materials"), hereby expressly incorporated by reference. In this non-limiting embodiment, the material or medium is at least partially coated with an active polymer having damping characteristics or other heat activated polymer, (e.g., a formable hot melt adhesive based polymer or an expandable foam, examples of which include olefinic polymers, vinyl polymers, thermoplastic rubber-containing polymers, epoxies, urethanes or the like) wherein the foamable or expandable material can be snap-fit onto the chosen surface or substrate; placed into beads or pellets for placement along the chosen substrate or member by means of extrusion; placed along the substrate through the use of baffle technology; a die-cast application according to teachings that are well known in the art; pumpable application systems which could include the use of a baffle and bladder system; and sprayable applications.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

Figure 2:
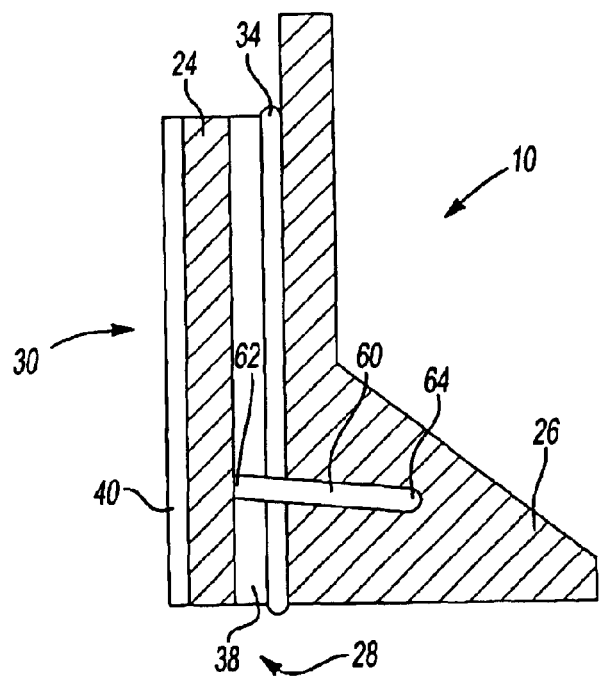
FIG. 2 is a top view of the exemplary assembly of FIG. 1.
Figure 3:
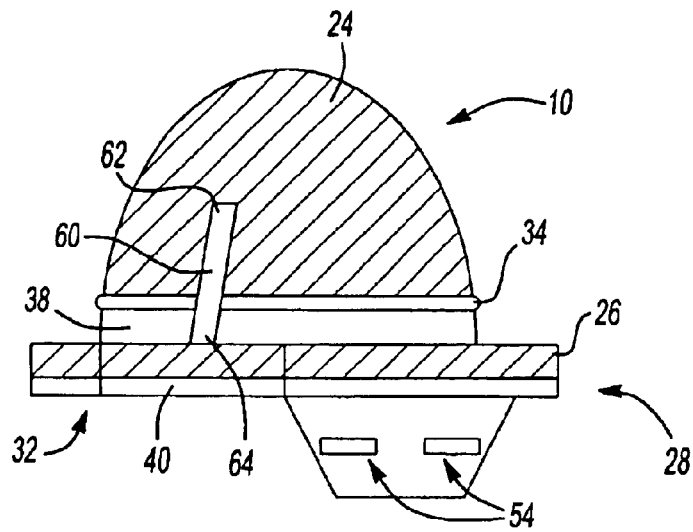
FIG. 3 is a front view of the exemplary assembly of FIG. 1.
Figure 5:
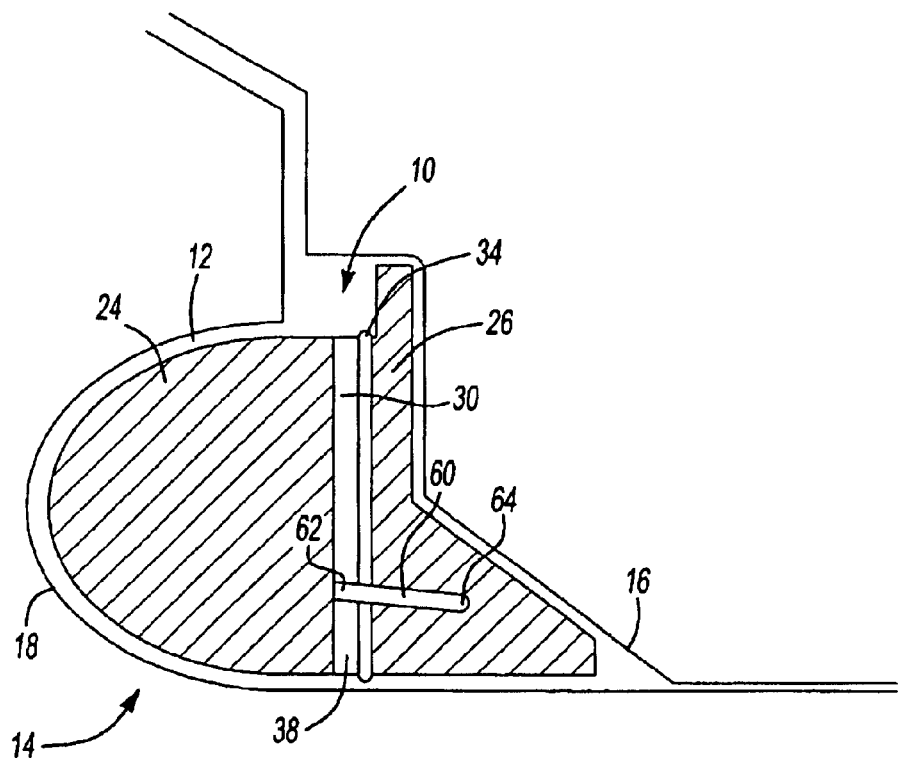
FIGS. 4 and 5 are top cut-away views of members of an automotive vehicle that form a cavity wherein the exemplary assembly of FIGS. 1–3 has been positioned within the cavity and subsequently self adjusted.
Figure 4:
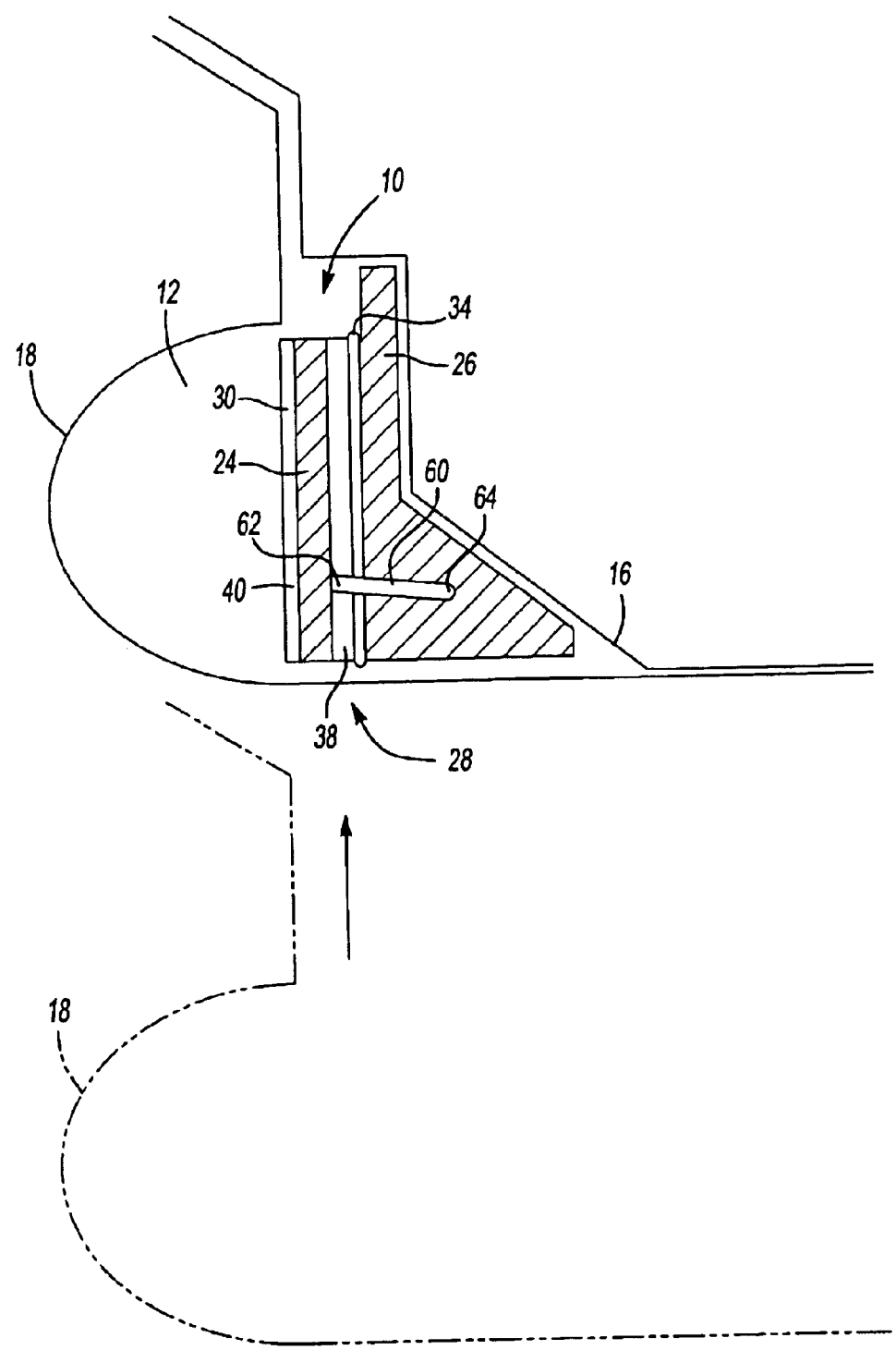

FIGS. 1–5 illustrate an example of an assembly 10 configured for placement within a cavity 12 of an automotive vehicle (not shown) for forming a sealing, baffling or structural system 14 along with one or more components or members 16, 18 of the vehicle. Preferably, the one or more components 16, 18 of the vehicle at least partially define the cavity 12. As will be appreciated, the assembly 10 may be suited for placement in a variety of cavities for reinforcing, baffling or sealing a variety of components of the automotive vehicle. For purposes of illustration, without limitation, the assembly 10 is shown in FIGS. 4 and 5 within a cavity 12 formed by a frame or body member (e.g. a rear quarter inner panel) 16 and another frame or body member (e.g. a rear body side outer panel) 18 of the vehicle.

Generally, the assembly will include one or more masses of expandable material that expand to assist in securing the assembly in a cavity and to assist in sealing, baffling, structural reinforcement or a combination thereof within the cavity. In the preferred embodiment shown, the assembly 10 includes a first mass 24 of expandable material adjustably (e.g., movably, rotatably, or hingedly) attached to a second mass 26 of expandable material, although greater or fewer masses may be employed. It is also preferable for the assembly 10 to have the ability to self-adjust such that at least one of the first mass 24 and second mass 26 of expandable material can be more effectively positioned within a cavity of a vehicle such as the cavity 12 in FIGS. 4 and 5.

Figure 1:
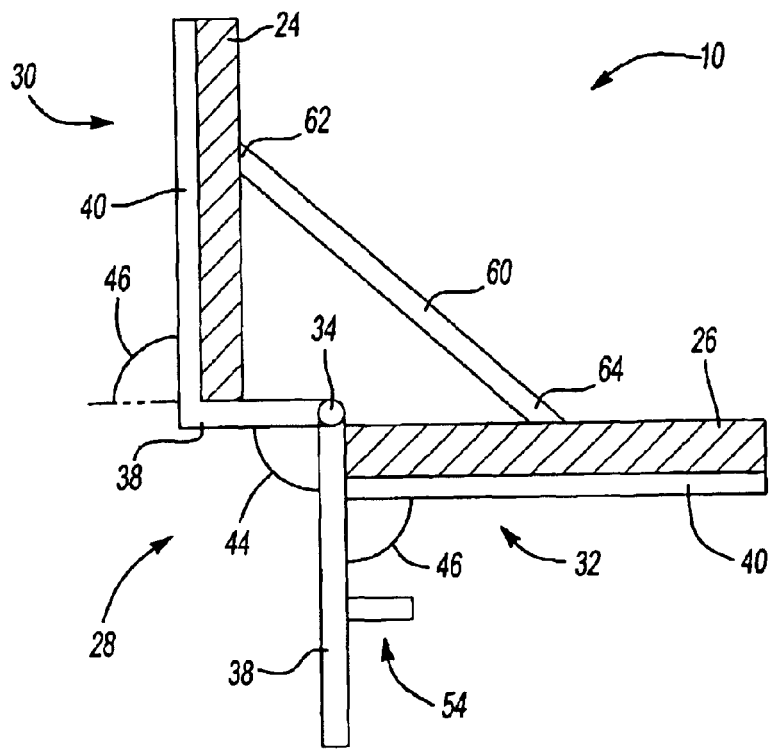
FIG. 1 is a side view of an exemplary self-adjusting assembly in accordance with an aspect of the present invention.

Referring to FIGS. 1–3, there is illustrated one exemplary embodiment of the assembly 10 of the present invention. The assembly 10 includes a carrier 28 that is comprised of a first member 30 hingedly attached to a second member 32 via a fastener 34, which as shown is a pin. It is contemplated, however, that a variety of different fasteners may be used to movably connect the first member 30 to the second member 32 and such fasteners may be integral with or separate from the members 30, 32. Moreover, the term fastener may refer to any connecting or hinging device.

Each of the members 30, 32 respectively at least partially supports one of the masses 24, 26 of expandable material. It is contemplated that the members 30, 32 and the masses 24, 26 may be formed in numerous shapes and configurations. Preferably the members 30, 32 and masses 24, 26 are shaped to substantially conform to a cavity into which they are to be positioned. It is also contemplated that the masses 24, 26 may or may not correspond to the members 30, 32. Further, it is contemplated that the masses 24, 26 may be connected directly to each other and that the assembly 10 may not include the members 30, 32.

In the exemplary embodiment shown, each of the members 30, 32 includes a first wall 38 and a second wall 40.

Preferably, each of the first walls 38 are rotatably connected to each other via the fastener 34 and extend away from the fastener 34 forming an angle 44 (e.g., a right angle) such that the first walls 38 are skew (e.g., perpendicular) to each other. In the embodiment shown, each of the second walls 40 extends away from the first walls 38 at an angle 46 (e.g., a right angle) such that the second walls 40 are skew (e.g., perpendicular) to the first walls 38. In the preferred embodiment illustrated, the second walls 40 are disposed at an angle (e.g., a right angle) relative to each other such that the walls 40 are also skew (e.g., perpendicular) to each other.

In preferred embodiments, the assembly 10 of the present invention may include one or more fasteners or fastening members for assisting in attaching the assembly 10 within or adjacent to a cavity of an automotive vehicle. In the embodiment illustrated, the first wall 38 of the second member 32 extends beyond the second wall 40 of the second member 32 and supports a pair of fastening members 54. Various fasteners 54 may be used with the present invention including, but not limited to, threadable fasteners, interference fit fasteners (e.g., snap fit fasteners) or the like for assisting in attaching the assembly 10 to members of the automotive vehicle.

The assembly 10 shown in FIGS. 1–3 also includes a connector member 60. Preferably, the connector member 60 is attached to the first mass 24 of expandable material, the second mass 26 of expandable material or both for at least temporarily maintaining the first mass 24 stationary relative to the second mass 26. It is also contemplated that the connector member 60 may be attached (e.g., fastened to, or integrally formed with the first member or the second member, but preferably not both). In the preferred embodiment, the connector member 60 extends between the masses 24, 26 of expandable material and extends within the first mass 24 of expandable material at one of its ends 62, 64 and into the second mass 26 of expandable material at another of its ends 62, 64 for maintaining the masses 24, 26 stationary relative to each other, although not required.

The first and second members 30, 32 and the connector member 60 may be formed from a variety of different materials including, but not limited to, metal, plastic, polymeric material, fiberglass, wood, fabrics, paper products or the like. Preferably, the first and second members 30, 32 are rigid or semi-rigid although not required. The connector member 60 may be rigid, semi rigid, elastic, pliable, flexible or the like. In a particular preferred embodiment, the first and second members 30, 32 and/or the connector member 60 could be formed of injection molded nylon, injection molded polymer, or molded metal (such as aluminum, magnesium, steel and titanium, an alloy derived from the metals, and even a metallic foam). In one embodiment, it is further contemplated that the connector member 60 may be formed of the same material as the masses 24, 26 and may be integrally formed therewith.

Preferably, masses 24, 26 of expandable material, and possibly the connector member 60, are formed of a heat activated material having foamable characteristics. The material may be generally dry to the touch or tacky and can be placed upon the members 30, 32 in any form of desired pattern, placement, or thickness, but is preferably a substantially uniform thickness. One exemplary expandable material is L-5204 foam available through L&L Products, Inc. of Romeo, Mich.

Though other heat activated materials are possible for the masses 24, 26 a preferred heat activated material is an expandable plastic, and preferably one that is foamable. A particularly preferred material is an epoxy-based foam. For example, without limitation, the foam may be an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of epoxy-based structural reinforcing, baffling or sound absorbing foams are known in the art and may also be used to produce the foam. A typical foam includes a polymeric base material, such as an epoxy resin or ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally-activated material, the foam is usually initially processed as a flowable thermoplastic material before curing. It will cross-link upon curing, which makes the material incapable of further flow.

An example of a preferred foam formulation is an epoxy-based material that is commercially available from L&L Products of Romeo, Mich., under the designations L5206, L5207, L5208, L5209, XP321 and XP721. One advantage of the preferred foam materials over prior art materials is that the preferred materials can be processed in several ways. The preferred materials can be processed by injection molding, extrusion compression molding or with a mini-applicator. This enables the formation and creation of part designs that exceed the capability of most prior art materials. In one preferred embodiment, the foam (in its uncured state) generally is dry or relatively free of tack to the touch and can easily be attached to the members 30, 32 through fastening means which are well known in the art.

While the preferred materials for fabricating the expandable material have been disclosed, the expandable material can be formed of other materials provided that the material selected is heat-activated or otherwise activated by an ambient condition (e.g. moisture, pressure, time or the like) and cures in a predictable and reliable manner under appropriate conditions for the selected application. One such material is the epoxy based resin disclosed in U.S. Pat. No. 6,131,897, the teachings of which are incorporated herein by reference, filed with the United States Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766,719; 5,755,486; 5,575,526; and 5,932,680, (incorporated by reference). In general, the desired characteristics of the foam include relatively high stiffness, high strength, high glass transition temperature (typically greater than 70 degrees Celsius), and good corrosion resistance properties. In this manner, the material does not generally interfere with the materials systems employed by automobile manufacturers.

In applications where the expandable material is a heat activated, thermally expanding material, an important consideration involved with the selection and formulation of the material comprising the foam is the temperature at which a material reaction or expansion, and possibly curing, will take place. For instance, in most applications, it is undesirable for the material to be reactive at room temperature or otherwise at the ambient temperature in a production line environment. More typically, the foam becomes reactive at higher processing temperatures, such as those encountered in an automobile assembly plant, when the foam is processed along with the automobile components at elevated temperatures or at higher applied energy levels, e.g., during painting preparation steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, blowing agent activators can be incorporated into the composition to cause expansion at different temperatures outside the above ranges.

Generally, suitable expandable foams have a range of expansion ranging from approximately 0 to over 1000 percent. The level of expansion of the foam may be increased to as high as 1500 percent or more. Typically, strength is obtained from products that possess low expansion.

Some other possible materials include, but are not limited to, polyolefin materials, copolymers and terpolymers with at least one monomer type an alpha-olefin, phenol/formaldehyde materials, phenoxy materials, and polyurethane. See also, U.S. Pat. Nos. 5,266,133; 5,766,719; 5,755,486; 5,575,526; 5,932,680; and WO 00/27920 (PCT/US 99/24795) (all of which are expressly incorporated by reference). In general, the desired characteristics of the resulting material include relatively low glass transition point, and good corrosion resistance properties. In this manner, the material does not generally interfere with the materials systems employed by automobile manufacturers. Moreover, it will withstand the processing conditions typically encountered in the manufacture of a vehicle, such as the e-coat priming, cleaning and degreasing and other coating processes, as well as the painting operations encountered in final vehicle assembly.

In another embodiment, the expandable material is provided in an encapsulated or partially encapsulated form, which may comprise a pellet, which includes an expandable foamable material, encapsulated or partially encapsulated in an adhesive shell. An example of one such system is disclosed in U.S. Pat. No. 6,422,575 ("Expandable Pre-Formed Plug"), hereby incorporated by reference.

In addition, as discussed previously, preformed patterns may also be employed such as those made by extruding a sheet (having a flat or contoured surface) and then die cutting it according to a predetermined configuration in accordance with a chosen structure and applying it thereto.

The skilled artisan will appreciate that the system may be employed in combination with or as a component of a conventional sound blocking baffle, or a vehicle structural reinforcement system, such as is disclosed in U.S. Pat. No. 6,482,486 or U.S. Pat. No. 6,467,834 (hereby incorporated by reference).

During formation of the system 14, and referring to FIGS. 4 and 5, the assembly 10 is preferably placed adjacent the first member 16 of an automotive vehicle. Thereafter, the second member 18 is assembled adjacent the first member 16 of the vehicle thereby forming the cavity 12 with the assembly 10 positioned within the cavity 12. It is contemplated, however, that the assembly 10 may be otherwise positioned within the cavity 12 of a vehicle. For instance, the assembly 10 may be placed within the cavity 12 after the second member 18 is assembled to the first member 16. Moreover, as previously discussed, several components within an automotive vehicle may form cavities suitable for receiving an assembly of the present invention.

In the embodiment illustrated, the assembly 10 is attached to the first member 16 of the automotive vehicle with the fasteners 54. As can be seen, the second member 32 (particularly, the second wall 40 of the second member 32) of the assembly 10 and the second mass 26 of expandable material are configured to substantially correspond to or mate with the first member 16 of the vehicle. Preferably, during attachment of the assembly 10 adjacent the first member 16, the connector member 60 maintains the first mass 24 of expandable material stationary relative to the second mass 26 of the expandable material and/or the second member 32 of the assembly 10. After attaching the assembly 10 adjacent the first member 16 of the vehicle, the second member 18 of the vehicle is assembled to (e.g., attached to) the first member 16 of the vehicle. As shown, the second member 18 of the vehicle is assembled to the first member 16 of the vehicle by moving the second member 18 substantially laterally relative to the first member 16. Advantageously, such lateral movement of the second member 18 of the vehicle is not hindered by the first member 30 of the assembly 10 whereas other non-adjustable members or assemblies would likely hinder such movement.

Once the assembly 10 is positioned as desired relative to the first and second members 16, 18 of the vehicle, at least one of the masses 24, 26 of expandable material is activated to expand. Upon such activation, the first mass 24 or second mass 26 of expandable material releases the connector member 60 such that the first mass 24 self-adjusts by moving (e.g., rotating, translating, combinations thereof or the like) relative to the second mass 24 of expandable material and/or the second member 32 of the assembly 10 thereby repositioning the first mass 24 of expandable material within the cavity 12. Advantageously, such repositioning allows the expandable material of the first mass 24 to be more effectively located within the cavity 12 particularly for the purposes of baffling or sealing within the cavity 12.

In the particular embodiment illustrated, both the first mass 24 and second mass 26 of expandable material are activated to expand. Upon such expansion, both masses 24, 26 become flowable and consequently, either or both of the masses 24, 26 depending upon the embodiment, release the connector member 60. As shown in FIG. 1, the first member 30 and first mass 24 of the assembly 10 are cantilevered relative to the fastener 34, which represents also an axis of rotation. Thus, when the masses 24, 26 release the ends 62, 64 of the connector member, the first member 30 and first mass 24 of the assembly self-adjust by rotating about the axis of rotation 34 relative to the second member. As a result, the first member 30 and the first mass 24 become substantially parallel, coplanar and/or coextensive with the second member 32 and the second mass 26 such that the members 30, 32 and masses 24, 26 more fully traverse the cross-sectional area of the cavity 12. Advantageously, such result allows for more thorough sealing or baffling of the cavity 12.

In alternative embodiments, it is contemplated that the first member 30 may attach (e.g., interlock or snap-fit) to the second member 32 upon self-adjustment of the assembly 10 such that the members 32 may further assist in structural reinforcement within the cavity 12. Moreover, it is contemplated that the axis of rotation of the assembly may be disposed as desired or needed depending upon the application of the assembly. It is also contemplated that cantilevers, counterweights, movement stops, combinations thereof or the like may be added to the assembly of the present invention or to portion of an article of manufacture to effect additional or alternative adjustments of the assembly or article of manufacture. It is further contemplated that, after movement (e.g., rotation) of the first member and/or the first mass of expandable material relative to the second member and/or second mass of expandable material, the first member and/or first mass may be oriented in a variety of alternative or additional relationships (e.g., skew, perpendicular or the like) relative to the second member and/or second mass.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A method of providing one or more of sealing, baffling and structural reinforcement within a cavity of an article of manufacture, comprising:
   (a) providing a first member of the article of manufacture;
   (b) providing a second member of the article of manufacture;
   (c) providing a dynamic self-adjusting assembly including:
      i) a carrier having a first member with a first surface and a second member with a first surface; and
      ii) a first mass of expandable material adhered to the first surface of the first member of the carrier;
      iii) a connector member preventing rotation of the first member of the carrier relative to the second member of the carrier.
   (d) positioning the self-adjusting assembly adjacent to the first member of the article of manufacture;
   (e) assembling the second member of the article of manufacture to the first member of the article of manufacture for forming a cavity; and
   (f) activating the first mass of expandable material wherein, upon activation of the first mass of expandable material, release of the connector member allows the first mass of expandable material and the first member of the carrier to rotate relative to the second member of the carrier.

2. A method as in claim 1 wherein the first mass of expandable material is applied to the first member of the carrier with a mini-applicator.

3. A method as in claim 1 wherein activating the first mass of expandable material is accomplished by exposing the first mass to an elevated temperature in an e-coat or paint operation.

4. A method as in claim 1 wherein the second member of the carrier includes at least one fastening member for attaching the assembly to the first member of the article of manufacture.

5. A method as in claim 1 wherein the second member of the carrier is shaped to correspond to the first member of the article of manufacture and the first member of the carrier is shaped to correspond to the second member of the article of manufacture.

6. A method as in claim 1 wherein the second member of the article of manufacture is moved laterally relative to the first member of the article of manufacture during assembly of the second member of the article of manufacture to the first member of the article of manufacture.

7. A method as in claim 1 further comprising a second mass of expandable material attached to the second member of the carrier wherein the first mass of expandable material and the second mass of expandable material are substantially coplaner relative to each other after rotation of the first mass of expandable material.

8. A method as in claim 1 wherein the first mass of expandable material is epoxy based and the first and second members of the carrier are formed of polymeric material.

9. A method of providing baffling within a cavity of an automotive vehicle, comprising:
(a) providing a first member of the automotive vehicle;
(b) providing a second member of the automotive vehicle;
(c) providing a dynamic self-adjusting assembly including:
   i) a carrier having a first member with a first surface and a second member with a first surface, said second member of the carrier hingedly attached to the first member of the carrier;
   ii) a first mass of expandable material adhered to the first surface of the first member of the carrier;
   iii) a second mass of expandable material adhered to the first surface of the second member of the carrier; and
   iv) a connector member having a first end at least partially disposed within said first mass and a second end at least partially disposed within said second mass;
(d) attaching the self-adjusting assembly to the first member of the automotive vehicle;
(e) assembling the second member of the automotive vehicle to the first member of the automotive vehicle for forming a cavity; and
(f) activating at least one of the first mass of expandable material or the second mass of expandable material thereby at least partially releasing the connector member such that the first mass and first member of the carrier rotate relative to the second mass and second member of the carrier thereby allowing the first and second masses of expandable material to more fully traverse a cross-sectional area of the cavity.

10. A method as in claim 9 wherein the first mass of expandable material is applied to the first member of the carrier with a mini-applicator.

11. A method as in claim 9 wherein activating the first mass of expandable material is accomplished by exposing the first mass to an elevated temperature in an e-coat or paint operation.

12. A method as in claim 9 wherein the second member of the carrier includes at least one fastening member for attaching the assembly to the first member of the automotive vehicle.

13. A method as in claim 9 wherein the second member of the carrier is shaped to correspond to the first member of the automotive vehicle and the first member of the carrier is shaped to correspond to the second member of the automotive vehicle.

14. A method as in claim 9 wherein the second member of the automotive vehicle is moved laterally relative to the first member of the automotive vehicle during assembly of the second member of the automotive vehicle to the first member of the automotive vehicle.

15. A method as in claim 9 wherein the first mass of expandable material and the second mass of expandable material are substantially coplanar relative to each other after rotation of the first member of the carrier.

16. A method as in claim 9 wherein the first mass of expandable material is epoxy based and the first and second members of the carrier are formed of polymeric material.

17. A method of providing baffling within a cavity of an automotive vehicle, comprising:
(a) providing a first member of the automotive vehicle wherein the first member of the automotive vehicle is at least part of a rear quarter inner panel;
(b) providing a second member of the automotive vehicle wherein the second member of the automotive vehicle is at least part of a rear body side outer panel;
(c) providing a dynamic self-adjusting assembly including:
   i) a carrier having a first member with a wall and a first surface and a second member with a wall and a first surface, said second member of the carrier hingedly attached to the first member of the carrier with a fastener;
   ii) a first mass of expandable material adhered to the first surface of the first member of the carrier;
   iii) a second mass of expandable material adhered to the first surface of the second member of the carrier; and
   iv) a connector member having a first end at least partially disposed within said first mass and a second end at least partially disposed within said second mass for maintaining the wall of the first member of the carrier cantilevered relative to the wall of the second member of the carrier thereby preventing rotation about the fastener;
(d) attaching the self-adjusting assembly to the first member of the automotive vehicle;
(e) assembling the second member of the automotive vehicle to the first member of the automotive vehicle for forming a cavity; and
(f) exposing the first mass of expandable material to heat causing at least one of the first mass of expandable material or the second mass of expandable material to flow and expand such that the first mass of expandable material or the second mass of expandable material releases the connector member allowing the first mass and first member of the carrier to rotate relative to the second mass and second member of the carrier thereby allowing the first and second masses of expandable material to more fully traverse a cross-sectional area of the cavity.

18. A method as in claim 17 wherein the first mass of expandable material is applied to the first member of the carrier with a mini-applicator.

19. A method as in claim 17 wherein activating the first mass of expandable material is accomplished by exposing the first mass to an elevated temperature in an e-coat or paint operation.

20. A method as in claim 17 wherein the second member of the carrier includes at least one fastening member for attaching the assembly to the first member of the automotive vehicle.

21. A method as in claim 17 wherein the second member of the carrier is shaped to correspond to the first member of the automotive vehicle and the first member of the carrier is shaped to correspond to the second member of the automotive vehicle.

22. A method as in claim 17 wherein the second member of the automotive vehicle is moved laterally relative to the first member of the automotive vehicle during assembly of the second member of the automotive vehicle to the first member of the automotive vehicle.

23. A method as in claim 17 wherein the first mass of expandable material and the second mass of expandable material are substantially coplanar relative to each other after rotation of the first member of the carrier.

* * * * *